Feb. 15, 1938.　　　H. N. JENKS　　　2,108,168
DEVICE FOR CLARIFYING LIQUIDS
Filed Dec. 26, 1933　　　2 Sheets-Sheet 1
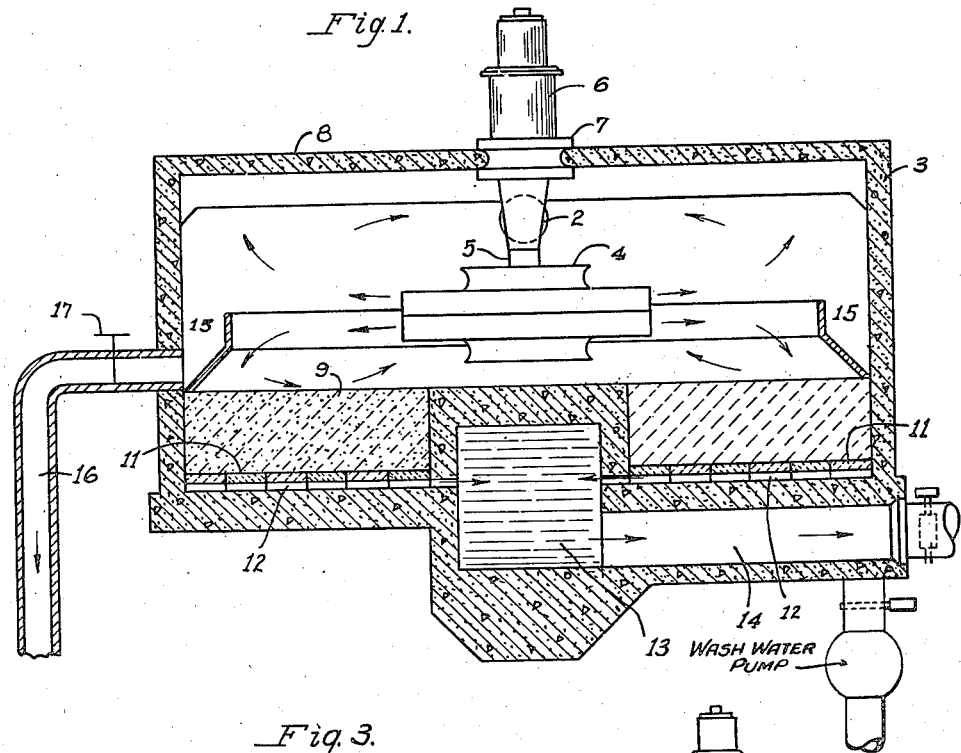
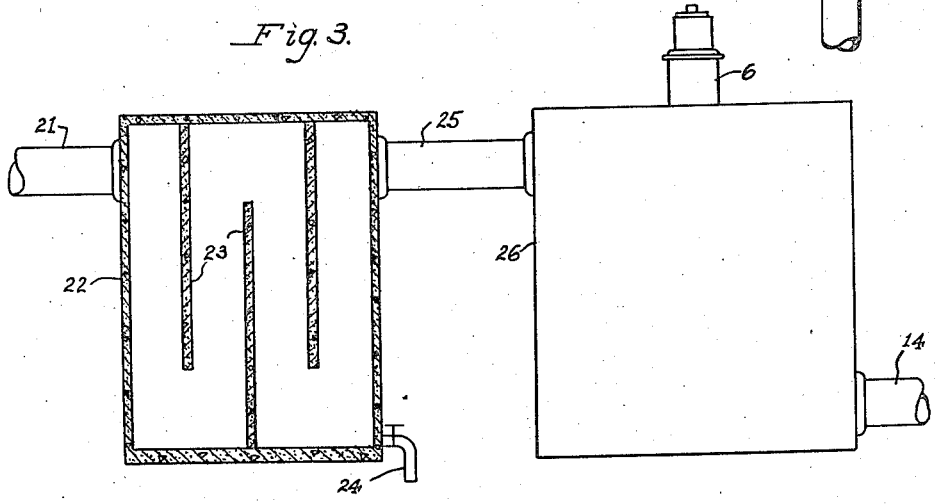
INVENTOR.
HARRY N. JENKS
BY R. C. Benner
ATTORNEY.

Feb. 15, 1938.  H. N. JENKS  2,108,168
DEVICE FOR CLARIFYING LIQUIDS
Filed Dec. 26, 1933  2 Sheets-Sheet 2
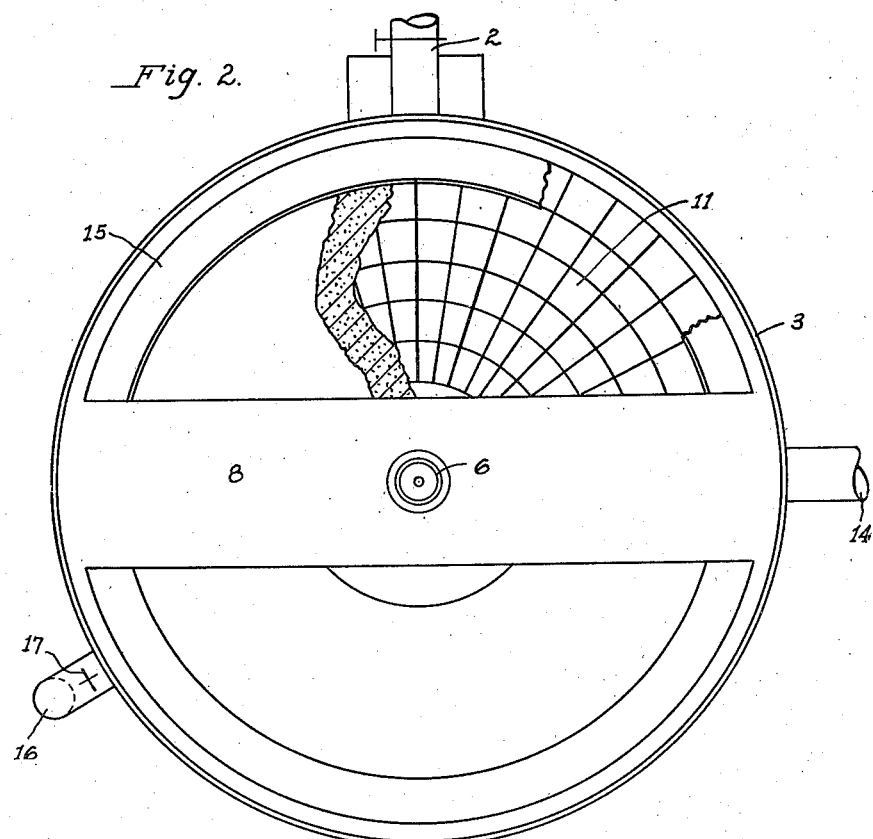
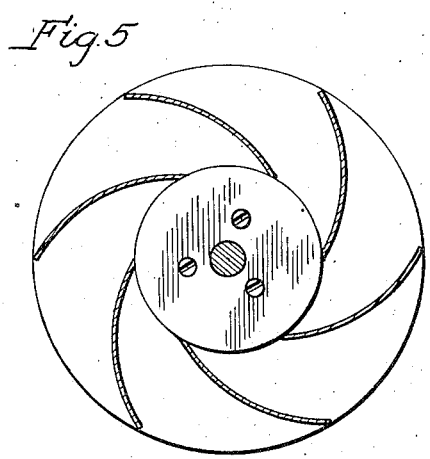
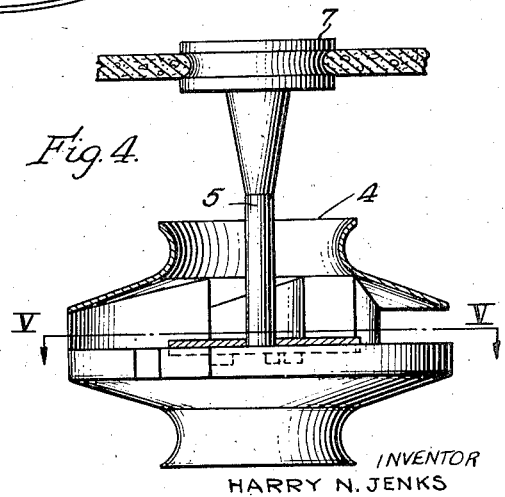
INVENTOR
HARRY N. JENKS
BY
ATTORNEY.

Patented Feb. 15, 1938

2,108,168

UNITED STATES PATENT OFFICE 2,108,168

DEVICE FOR CLARIFYING LIQUIDS

Harry N. Jenks, Berkeley, Calif.

Application December 26, 1933, Serial No. 703,903

8 Claims. (Cl. 210—123)

This invention relates to methods for clarifying liquids and to improved apparatus for carrying out such clarification. One of the uses to which my invention is suited is that of the purification of liquids, such as water, in which the processes of segregation of impurities with the aid of a coagulant, such as alum, the sedimentation of the coagulated material, and the filtration to separate the purified liquid, are carried out concurrently in a compactly arranged structure with consequent diminution of construction costs. My invention is particularly applicable, for example, to rapid sand filtration units such as are described in my United States patent, No. 1,805,667, issued May 19, 1931, and in my copending application Serial No. 677,605, filed June 26, 1933.

There has been in the past an extensive use of sand filters in the purification of water. The water is usually first treated with chemicals such as coagulants. The chemical treatment is performed in a mixing chamber. The water is then passed to a large settling chamber where a portion of the precipitate containing impurities is collected. The water then passes on to a chamber containing a layer of sand distributed over a layer of gravel. With this treatment it is possible to pass the water much more rapidly through the sand bed than is the case where the removal of the precipitate is accomplished solely by the use of a thick layer of sand. It is difficult, however, to prevent the sand from being washed down into the gravel.

My United States patent, No. 1,805,667, discloses the use of a bed of sand supported on a filter base, which base permits the passage of purified water while preventing the passage of the sand grains. The filter base is also provided with conduits through which purified water can be forced from time to time in the reverse direction to clean the sand after it has become clogged with impurities. Such impurities tend to collect, particularly in the uppermost layer of the sand bed. One of the objects of the present invention is to accomplish the hydraulic removal of the excess precipitate or floc from the surface of the sand bed without interruption of the operation of the filter.

The principal objects of my invention are therefore to provide methods of purifying water in which sand beds are used at desirably high rates of filtration while the process of floc formation is carried on in the water above the sand, the upper surface of the sand being washed continuously to remove excess floc or precipitate from the surface of the sand bed.

Apparatus which may be used in carrying out my improved method is illustrated by the accompanying drawings in which:

Figure 1 is a sectional elevation of the treating chamber;

Figure 2 is a plan view of the treating chamber with successive parts broken away;

Figure 3 indicates diagrammatically a modified arrangement in which the mixing unit is separate from the filtering unit; and Figure 4 is a side elevation of a double-suction central discharge mixing pump runner, part of the upper half being cut away to indicate some of the rotor blades; and Figure 5 is a section on the line V—V of Figure 4.

Referring to the drawings in detail, raw water, together with a coagulating agent such as alum, is admitted through an influent pipe 2 into the treating chamber 3. The application of the coagulant (such as filter alum) may take place at any convenient point; for example, in the influent line before the water reaches the treating chamber 3. Thus upon entering the chamber the chemical reaction of the coagulant has begun. After entering the chamber the water is circulated around the upper part of the chamber by means of a double-suction central discharge mixing pump runner 4 which is mounted on a vertical shaft 5 driven by a suitable motor 6. This rotating mechanism is supported in a bearing 7 which is mounted on a bridge 8 that spans the chamber. During this circulation the formation of the floc goes on. The speed of the mixing pump is regulated so that it will produce a well formed precipitate and at the same time effect the desired scouring action upon the surface of the sand bed. I have determined by experiment that the peripheral velocity of the pump runner should range from two to six feet per second for adequate mixing. When rotating at this speed the pump runner induces currents in the mass of water above the sand bed 9, which currents are sufficient to keep excess floc in suspension above the sand bed. The expression "excess floc" is used to designate the mass of precipitated material (resulting from coagulation) that would normally settle out and be retained in the sedimentation basin ordinarily provided in a rapid sand filtration plant. In the usual sand filter and also in my sand filtering device a certain amount of the floc must be allowed to accumulate on the top surface of the sand bed in order to form a gelatinous mat technically known as a "Schmutzdecke"; that is, the top layer of the filter. The effective filtering action of the sand bed is confined largely to this top layer and to the upper two to six inches of sand into which the floc penetrates.

After passing through the sand bed, the filtrate reaches a diffuser medium filter bottom which is made up of porous ceramic plates 11 which are cemented together at their sides by means of asphalt or other suitable water-resistant material. The lower portions of the plates 11 are provided with channels 12 through which the filtrate passes into the chamber 13 which is the collecting chamber for all the channels 12. From this chamber the filtered water passes out through the pipe 14 and a suitable rate of filtration controller (not shown) to the point of use of the water.

The filtering action of the sand results in a gradual clogging of the sand bed so that, after a period of time known as a filter run, the filter operation must be interrupted and the sand bed cleansed of its impurities. The established practice is to backwash the filter with water previously purified. After closing the influent valve (by means of which raw water is admitted), filtered water is forced upward through the filter bottom raising the filter sand over the porous plates and imparting to the sand grains a violent swirling motion that dislodges impurities adhering to sand particles. In my filtering device a pump (not shown) can be used to force filtered water through the pipe 14, the chamber 13 and the various channels 12, whence it passes through the porous plates 11 and then up through the sand bed. The floc, being lighter than the sand particles, rises higher. Part of the floc will be caught in the annular trap 15 and carried away through the drain pipe 16. During this washing operation the valve 17 is open. This washing operation usually only takes a comparatively short time and the filtering operation is resumed. During this much longer operation the valve 17 is closed and the valve in the influent pipe 2 is opened, the raw influent water taking the course previously described.

Referring again to the washing of the sand bed, the operation of the mixing pump may be suspended during the washing process. In this case the presence of the pump runner helps to direct the currents of the agitated liquid and to deflect part of the floc toward the washwater discharge trough 15. In the case, however, of water containing considerable amounts of impurities, it is desirable to rotate the mixing pump runner while clean water and sometimes mixtures of water and air are forced upward through the porous plates 11. The runner may be operated at such a speed as to cause a recirculation of the sand grains themselves through the runner and within the zone below the washwater troughs, thus enhancing the cleansing action.

Similarly during the filtering the speed of the runner may be increased from time to time to a point where the upper layers of sand are thrown into suspension, the grains being recirculated with the water and again deposited when the speed of the runner is lowered.

In some raw water there may not be initially a sufficient amount of solid material in the entering water to promote coagulation. The operation of the mixing pump in my device throws additional solid matter into the liquid above the sand bed and so promotes coagulation. In a conventional rapid sand filter plant, where the return of floc is practiced, the floc or sludge from the settling basin must be pumped back into the mixing tanks and remixed with the incoming alum dosed water. In my invention the return of the floc from those places where it has settled by gravity to places higher up in the liquid is accomplished automatically.

In the modification indicated in Figure 3, the raw water enters a tank 22. The water may be treated with a coagulant before it enters the tank 22 or the coagulant may be added from time to time to the tank 22. A series of partitions 23 is indicated to give the liquid a long path through the tank. Sediment drops to the bottom of the tank and can be removed from time to time through an outlet 24. The water, relieved of a portion of its impurities, passes through a pipe 25 into a chamber 26 which is similar in its internal construction to the chamber 3 described at length above.

Such a combination as that indicated diagrammatically in Figure 3 is suitable for conditions where the characteristics of the raw water are such that a separate coagulation stage is required; for example, where it is desired to coagulate impurities in the water with considerable care. This combination of units permits the establishment of two stages of mixing, one for coagulation and the other for further mixing and for filtering.

My apparatus may be used not only for the purification of water but also for the treating of sewage. In using the sand filter for the treatment of sewage, it is desirable to more thoroughly scour the sand and relieve it of clogging constituents.

A further modification of my invention involves the introduction of an air wash over successive sections of the filter bed while the filter is in operation. This may be accomplished by an appropriate system of valves and piping communicating with each filter plate of the filter bottom. This feature is of particular value in connection with the treatment of sewage where my filter would be used for the separation of raw sewage solids or sludge from the liquid. This treatment can include chemical or biochemical precipitation of solids. My device takes up much less space and requires less construction work than the large sedimentation basins which are used in connection with continuous sludge removal equipment. The use of an air wash in connection with my device aids not only in removing the clogging constituents from the sand bed during operation but also in furnishing a sufficient amount of atmospheric oxygen to maintain the required aerobic conditions within the filter bed as is necessary with the continuous filtration of sewage.

I claim:

1. A water treatment unit comprising a chamber having an inlet for raw water and coagulant in its upper portion and an outlet for treated water at its base, a filter bed located in the lower portion of the chamber and supporting a mass of water that extends from the upper surface of said filter bed to the upper part of the chamber, a trough extended around the inner circumference of the chamber and situated above the filter bed, means comprising a double-suction pump for producing prolonged circulation of the water and coagulant laterally from the pump toward the inlet edge of the trough and thence upwardly and back through the upper intake of the pump and for producing similar circulation laterally from the pump and downwardly and back through the lower intake of the pump, and means for producing at intervals a reverse flow of filtered water upwardly through the filter bed, heavier impurities being thrown by centrifugal force into the above mentioned trough as a result of the circulation produced by said pump.

2. The method of purifying a liquid, which method comprises supplying a precipitating agent to the liquid, then transmitting the liquid to a purification chamber through an inlet placed some distance above the surface of a filter bed, and circulating the fluid and precipitate by means of currents which are projected laterally above and also below an intermediate level within the liquid that is supported on the upper surface of said filter bed in the chamber, the said currents being circulated by doubly acting rotating means disposed above and below said intermediate level, part of the circulation in the lower portion of the liquid being directed along the upper surface of the filter bed, whereby precipitated masses are swept through the liquid under treatment and heavier precipitated masses are swept up from the surface of the filter bed and returned to the general circulation.

3. The method of purifying water which comprises supplying a coagulant to the impure water, then transmitting it to a purification chamber through an inlet placed some distance above the upper surface of a filter bed, and circulating the water and floc by means of currents which are projected laterally above and also below an intermediate level within the liquid that is supported on the upper surface of said filter bed in the chamber, the said currents being circulated by doubly acting rotating means having peripheral velocities of two to six feet per second and part of the circulation in the lower portion of the liquid being directed along the upper surface of the filter bed, whereby floc is swept through the liquid under treatment and excess floc is swept from the surface of the filter bed and returned to the general circulation.

4. The method of purifying water which comprises supplying a coagulant to the impure water before its inflow into a filter tank, recirculating the water above a filtering bed in the filter tank while the process of coagulation is still going on, the circulation being directed outwardly and upwardly from the central portion of the liquid that overlies the filter bed and back again toward the center and also downwardly along the upper surface of the filtering bed and back again, and periodically forcing treated water upward through the filter reversely to the normal direction of flow, the water and floc being recirculated during this backwashing process with sufficient velocity to transport a portion of the precipitate into a trough that encircles the filter chamber and is open thereto, the recirculation being maintained in both processes by means of a double suction pump having lateral discharge and located centrally within the liquid that overlies the filter bed.

5. The method of purifying water which comprises supplying a coagulant to the impure water before its inflow into a filter tank, circulating the water and floc during the prefiltration process by doubly acting rotating means having peripheral velocities ranging from two to six feet per second, said rotating action being produced both above and below an intermediate level in the liquid above the filter bed, part of the circulation in the lower portion of the liquid being directed along the upper surface of the filter bed, and periodically increasing the speed of the rotating means sufficiently to sweep sand and impurities from the upper layers of the filter bed into the circulation of water and floc.

6. The method of purifying water which comprises supplying a coagulant to the impure water before its inflow into a filter tank, circulating the water and growing floc during the prefiltration process by doubly acting rotating means having peripheral velocities ranging from two to six feet per second, said rotating action being produced both above and below a substantially central area in the liquid above the filter bed, periodically increasing the speed of the rotating means sufficiently to sweep sand and impurities from the upper layers of the filter bed, and periodically washing the filter bed by forcing treated water up through the filter bed, and circulating the water and impurities at a sufficient speed to transport a portion of the precipitates into a trough that encircles the filter chamber and is open thereto.

7. The method of purifying water which comprises adding a coagulant to water to be purified, subjecting the water in which coagulation is occurring to prolonged circulation in the upper portion of a filter chamber at levels adjacent that of the water inlet and to similar circulation at lower levels adjacent the top of the filter bed and in contact with material deposited thereon, said circulation affecting extensive floc formation and segregation of impurities, and filtering the treated water after it has passed through both zones of circulation.

8. The method of purifying water which comprises adding a coagulant to water to be purified, subjecting the water in which coagulation is occurring to prolonged circulation in the upper portion of a filter chamber at levels adjacent that of the water inlet and to similar circulation at lower intervals adjacent the top of the filter bed to effect extensive floc formation and segregation of impurities, and filtering the water after it has passed through both zones of circulation by passing it first through an upper layer of the filter bed that is impregnated with precipitated floc and then through a lower part of the filter bed which is substantially free from floc.

HARRY N. JENKS.